UNITED STATES PATENT OFFICE.

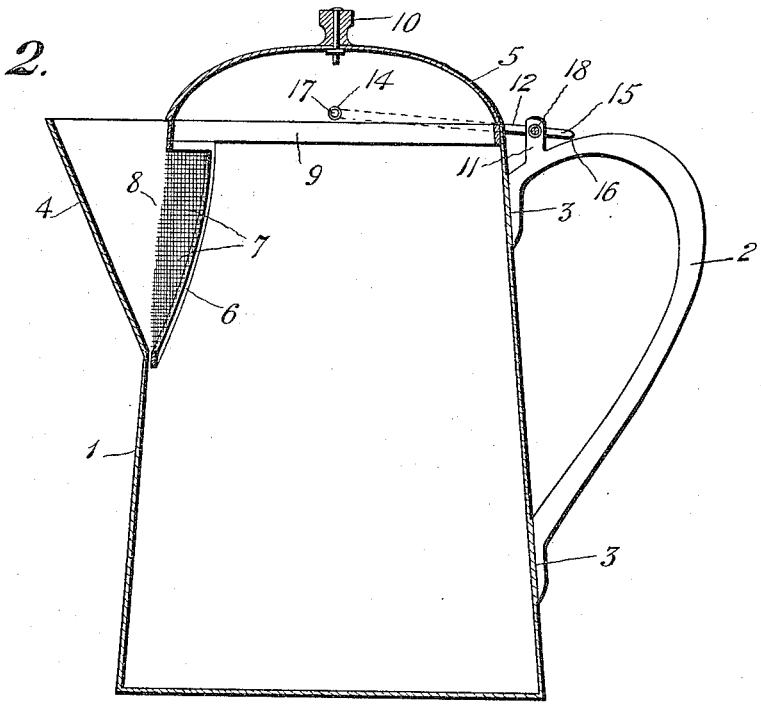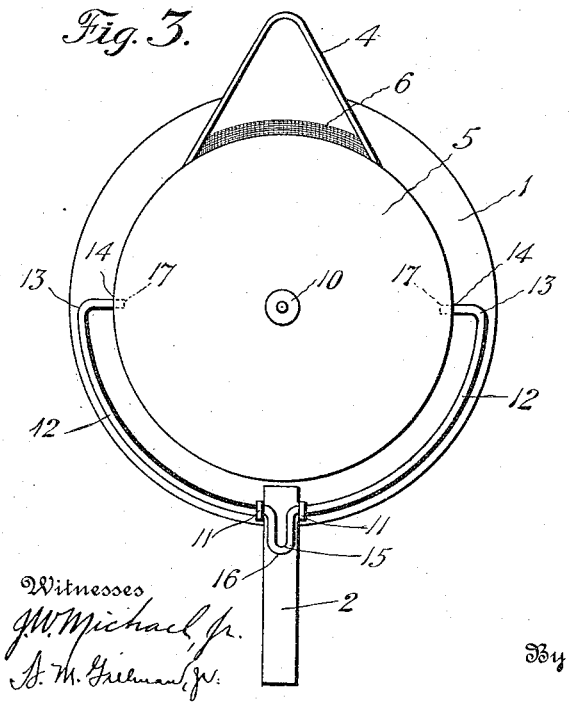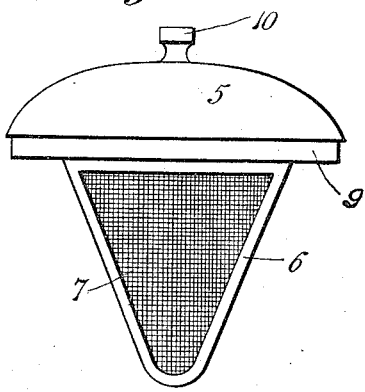

HARRY STEVENS ISHAM, OF BELMAR, NEW JERSEY.

COFFEE-POT.

1,170,539.  Specification of Letters Patent.  Patented Feb. 8, 1916.

Application filed October 24, 1912. Serial No. 727,631.

*To all whom it may concern:*

Be it known that I, HARRY S. ISHAM, a citizen of the United States, residing at Belmar, in the county of Monmouth and State of New Jersey, have invented certain new and useful Improvements in Coffee-Pots; and I do hereby declare the following to be a full, clear, and exact description of the invention, such as will enable others skilled in the art to which it appertains to make and use the same.

This invention relates to means for straining the liquid contents of a vessel, especially tea and coffee, and to prevent the cover of the receptacle from being accidentally detached therefrom while pouring the liquid into a suitable container, such as a cup, etc.

With these ends in view, this invention consists of a cover having a downwardly depending strainer which is preferably rigidly attached to the cover, and resilient means whereby said cover and strainer will be clamped firmly to the vessel and in operative relation thereto and which may be detached from the cover when it is desired to remove the latter for any reason, such as removing the contents of the vessel, for the purpose of cleaning the same, etc.

This invention also consists in the features of construction and combinations of parts hereinafter described, illustrated in the accompanying drawing, and specified in the appended claims.

Figure 1 is a side elevation of the cover with strainer attached. Fig. 2 is a section through the vessel with all parts in operative position. Fig. 3 is a top plan view of the vessel.

Corresponding parts in the several figures of the drawings are designated by like characters of reference.

Referring more particularly to the drawings, 1 designates the body of a coffee pot or like vessel; 2 is the handle secured to the vessel by any suitable means at 3, such as soldering or riveting the same thereto, and 4 is the discharge spout or lip positioned at the upper portion of the vessel.

5 represents the cover to the vessel having the usual means 10 for raising the same out of its normal position, and 6 is a strainer preferably attached rigidly thereto by any suitable means.

When the cover 5 is placed in position on the vessel, the strainer 6, which is preferably attached rigidly thereto, and has suitable perforations 7 formed therein, assumes a position parallel to that of the wall of the vessel and being of substantially the same height and width as the exit port 8, formed in the wall of the vessel at the point where the lip or spout 4 joins said wall, it will be seen that the strainer 6 will completely cover said exit port 8 and act as a strainer for the contents of the vessel. The strainer 6 is preferably rigidly attached to the flange 9 of the cover so as to allow of an easy adjustment of the cover and also to permit of said strainer being placed as close to the wall of the vessel as possible. The strainer may be of any suitable size and project at any angle downwardly from the cover, this being governed entirely by the shape and size of the vessel.

Integral with the handle 2 are two small lugs 11, one rising above the surface of the handle on each side of said handle and having small holes or sockets 18 formed therein for the reception of a semi-circular shaped resilient clamping member 12, which passes through these holes or sockets 18 over the handle in a U-shaped path 15, and substantially half way around the cover 5 of the vessel where the ends 17 of said resilient clamping member 12 are bent inwardly at 13, and engage small holes or sockets 14 formed in said cover. When the ends 17 of the resilient clamping member 12 are sprung into the holes or sockets 14, the U-shaped portion 15, which is adapted to engage the upper portion of the handle 2 at 16, firmly clamps the cover and strainer on the vessel and in operative relation thereto.

When it is desired to remove the cover 5 and strainer 6, all that is necessary for the operator to do is to spring the clamping member 12 out of its holes or sockets 14 and thus take the pressure off the cover and allow the same to be raised from the vessel 1.

When a vessel embodying these improvements is used, the coffee, tea, or other beverage is placed in the vessel, the cover is then adjusted in its place, and the resilient clamping member, which when not used will hang loosely at the side of the vessel, is raised to a position where it will engage the holes or sockets in the cover, and exert a downward pressure sufficient to hold said cover and strainer in operative relation to the vessel. The cover is thus pivotally clamped to the vessel and adapted to oscillate upon the resilient clamping member when said cover is raised.

The right is herein reserved to make such changes in the construction of my device as may truly fall within the scope of my invention without departing from the spirit or sacrificing the advantages of the same.

Having thus fully described my invention what I claim as new and desire to secure by Letters Patent is:—

1. In a device of the class described, the combination with a receptacle and a removable cover therefor, said cover being provided with a straining element attached thereto, of resilient means the ends of which are adapted to engage oppositely positioned sockets on said cover, said resilient means being pivoted to the forward part of the handle of said receptacle and adapted to lock said cover on the receptacle by engagement with said handle at a point in arrears of said pivotal engagement.

2. In a device of the class described, the combination with a receptacle and a removable cover therefor provided with retaining sockets, a plurality of lugs mounted on the receptacle, resilient means fulcrumed to said lugs and adapted to be seated in the sockets of said cover to lock said cover on the receptacle, said resilient means comprising a U-shaped portion and a plurality of arms extending from the U-shaped portion outwardly and forwardly and into engagement with said cover, said U-shaped portion being adapted to engage a part of the receptacle to limit the pivotal movement of the resilient member in one direction.

3. In a device of the class described, the combination with a receptacle having a plurality of upstanding lugs, of a removable cover provided with oppositely positioned sockets, and means to lock said cover in its closed position on the receptacle, said locking means comprising substantially arcuate resilient arms adapted to engage said socket, said arms being provided with a substantially U-shaped member adapted to be positioned between said lugs and to bear against a portion of the receptacle to lock the cover in its closed position.

In testimony whereof, I affix my signature, in presence of two witnesses.

HARRY STEVENS ISHAM.

Witnesses:
MILO H. CREGO,
THOMAS W. BURTT.

Copies of this patent may be obtained for five cents each, by addressing the "Commissioner of Patents, Washington, D. C."